United States Patent Office 2,985,324
Patented May 23, 1961

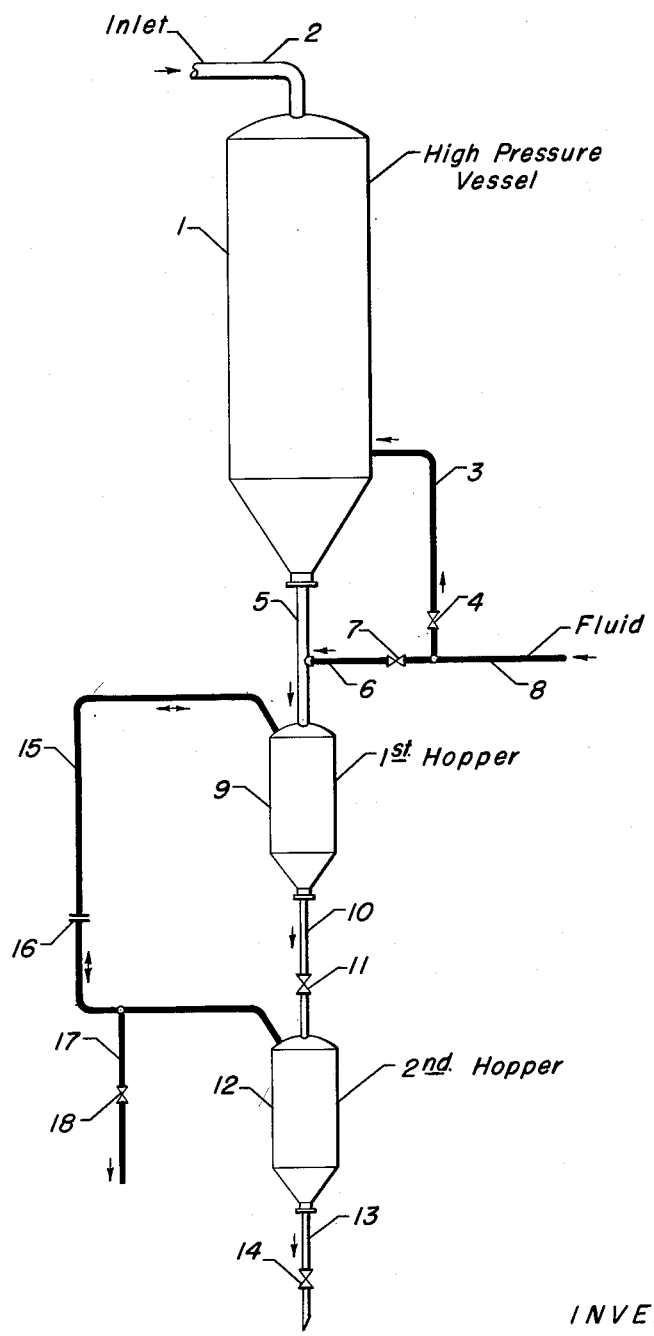

2,985,324
APPARATUS FOR PASSING PARTICLES FROM A HIGH PRESSURE VESSEL

James H. Balentine, Shreveport, La., assignor, by mesne assignments, to Universal Oil Products Company, Chicago, Ill., a corporation of Delaware Filed Apr. 21, 1958, Ser. No. 729,616

3 Claims. (Cl. 214—17)

This invention relates to an apparatus for passing particles from a high pressure vessel and particularly to an apparatus for passing small particle-form solids entrained in a fluid stream from a high pressure zone to a low pressure zone.

In many applications, it is useful to move solid particles from high pressure to low pressure. Some typical examples of processes employing this invention are those wherein moving bed heterogeneous catalysts are employed or those in which the product from the process is a particle-form product and its treatment includes some high pressure.

Moving particle-form solids which are entrained in a fluid stream is presently accomplished by many well known methods. One form of particle discharge apparatus is a star feeder, that is, a housing having a circular cross section in which rotating radial vanes pass particles through the housing while maintaining a seal between the inlet and the outlet of the feeder. Star feeders have many problems associated with their use. Star feeders can be used only for limited pressure ranges and are not useful for extremely high pressures. Star feeders maintain a very poor seal and accordingly, cannot be used as a valve to completely seal the high pressure apparatus. In the operation of star feeders the radial vanes pass through a dense column of particles many times and, in sealing with the housing, they cause shearing of particles and compacting of the bed of particles between the vanes so that particles are destroyed by crushing and shearing. Shearing of particles is particularly serious when the particles are fragile. When the particles are hard and abrasive, the seal between the vanes and the housing is destroyed by abrasion.

In high pressure applications where star feeders cannot be used, the usual method for discharging particles is by a pressure lock which is characterized by two valves in the discharge from the high pressure vessel between which a capacity is maintained. The pressure lock is operated by opening the uppermost valve while keeping the lowermost valve closed and when the capacity between the valves is filled with particles, to close the uppermost valve and then open the lowermost, thereby discharging the particles between the valves while still maintaining the vessel at high pressure. The difficulties encountered with a pressure lock are similar to those with a star feeder. Each time the uppermost valve is closed, it grinds the particles in the seating area and compacts the bed of particles in the space between the valves, thereby destroying particles by crushing. In addition, closing the valve containing a dense particle form medium is a very difficult mechanical operation which accelerates the destruction of the valve. It is an object of this invention to provide an improved apparatus for discharging particles from a pressure vessel without crushing the particles, without shearing the particles, with closing of the valves only in a particle-free fluid medium and in an apparatus that can maintain a seal even at extremely high pressures.

It is an embodiment of this invention to provide an apparatus for passing solid particles entrained in a fluid stream from a high pressure zone to a low pressure zone which comprises in combination a high pressure vessel, a hopper below said vessel and connected to it with an unobstructed conduit, a second hopper of larger volume than said first hopper and connected below it and to the lower portion of said first hopper with a valved conduit, a valved discharge from the bottom of said second hopper, means for introducing fluid into said vessel and means for introducing fluid into said unobstructed conduit.

In a more limited embodiment, this invention deals with an apparatus for passing solid particles entrained in a fluid stream from a high pressure zone to a low pressure zone which comprises in combination a high pressure vessel, a hopper below said vessel and connected to it with an unobstructed conduit, a second hopper of larger volume than said first hopper and connected below it and to the lower portion of said first hopper with a valved conduit, a valved discharge from the bottom of said second hopper, means for introducing fluid into said vessel, means for introducing fluid into said unobstructed conduit, means for venting said second hopper and means for bleeding said first hopper.

Briefly, this invention consists of a special double lock hopper arrangement for discharging particles entrained in a fluid from a high pressure zone to a low pressure zone. This is accomplished by maintaining the uppermost or the first hopper in open communication with the high pressure vessel and sealing the first hopper from the high pressure vessel with regard to particle flow, by introducing a fluid in the unobstructed conduit connecting the high pressure vessel to the first hopper. When fluid is not flowing into the unobstructed conduit, particles may flow from the high pressure vessel to the first hopper thereby filling it. When the first hopper is full, a high pressure fluid stream is introduced into the unobstructed conduit, flowing up the conduit at sufficient velocity to prevent particles from passing down. In other words, the particles in the high pressure vessel are maintained at least partly as a fluidized bed and cannot descend into the first hopper. While the particle-sealing fluid is flowing, a valve in the discharge from the first hopper is opened and the particles in the first hopper descend by gravity into a second hopper which is maintained below the first hopper and which has a substantially larger volume than the first hopper. The particles going into the second hopper do not fill it completely so that when the valve separating the two hoppers closes it closes well above the level of the particles in the second hopper and in a particle-free fluid environment. At this point of the operation, the second hopper is full of particles and the first hopper is empty and the flow of fluid into the unobstructed conduit may be stopped. When the fluid flow is stopped, particles again descend from the high pressure vessel into the first hopper and while filling of the first hopper is in progress, the second hopper may be opened to the lower pressure zone, for example, atmospheric pressure, and be discharged. When the second hopper is empty, the valve connecting it to the lower pressure zone is closed, fluid is again introduced into the unobstructed conduit and the valve separating the first from the second hopper is again opened, repeating the cycle.

To greatly improve the operation of the double hoppers, it is useful to maintain a bleed in the first hopper so that the fluid which entrains the particles may escape from the first hopper thereby permitting the particles to flow into it rather than merely to gravitate. It is also a great improvement in the process to have a vent or source of pressure in the second hopper so that the particles in it may be removed in a flowing fluid stream rather than by mere gravitation. It is an embodiment of this invention to connect the top of the first hopper with the top of the second hopper by means of a restricted conduit which may be an ordinary line containing a restriction or a capillary type line. This line acts both as a vent and bleed by providing for a slow removal of fluid from the first hopper when it is filling and a slow introduction of fluid into the second hopper while it is emptying.

It is intended to use the terms describing this invention in their most general sense. Therefore, a high pressure vessel is intended to mean any vessel maintaining particle-form solids which are capable of flowing through conduits and which are to be discharged into a lower pressure area. A high pressure vessel is intended as a relative term meaning higher pressure than the ultimate destination of the particles and not necessarily high absolute pressures. Similarly, the term hopper is intended to mean any suitable capacity for containing the particles to be discharged. In its broadest sense, the term hopper is equivalent to a sufficient length of pipe to contain the volume of particles desired to be discharged in each cycle of the operation and it is intended to include vessels of any capacity and any shape. The term conduit is also used in its broadest sense and implies a passageway between zones whether circular in cross section, square in cross section and whether elongated or merely a restricted opening in a plate or vessel wall. The restricted conduit, as heretofore stated, is intended to include any passageway for fluid which has a sufficiently restricted flow so that escape of fluid through it is subjected to enough resistance to prevent rapid equalization of pressure between the high and low pressure regions. As heretofore stated, the restriction can include an orifice, a valve or merely sufficient length of small diameter tubing to produce the desired resistance to fluid flow.

The apparatus of this invention may be best described with reference to the accompanying drawing which illustrates in schematic elevation view one embodiment of the invention and is intended to be illustrative rather than limiting in its broad scope.

For purposes of illustration, this invention will be described with reference to the manufacture of spherical particles of alumina from alumina hydrosol for the purpose of making a support for a metallic catalyst. In order to form a suitable support, the spherical alumina particles must be extremely porous and exhibit high surface area per unit of volume. Suitable alumina hydrosols, which are hydrous liquids characterized by the ability to gel or set into fragile solids in a brief time when in proper environment, may be formed by dissolving aluminum in aluminum chloride solution according to known techniques. When the hydrosol is formed and dispersed as droplets in a hot medium which preferably is slightly alkaline, the precipitation or coagulation of the mixture into alumina hydrogel is accelerated so that, in a very brief time, fragile spheres of hydrgel are formed. To obtain desirable physical characteristics of the ultimate product, these spheres must be aged and it has been found that aging them in hot oil under pressure produces spheres of excellent quality. After the aging, the spheres must be dried and calcined by heating to a temperature of about 1000° F. in an oxygen atmosphere and after calcination, they are hard and resistant to destruction. Prior to calcination, however, the spheres are soft and require very gently treatment in order to survive in the form of spheres.

In the figure, high pressure vessel 1 represents an aging vessel in which fragile hydrogel spheres are aged in hot oil for a period of from about 1 hour to about 24 hours or more. After the aging period the spheres, which are still fragile, must be discharged from vessel 1, drained of oil and dried and calcined. When the spheres are aged and it is time to discharge them from vessel 1, fluid flow through line 8 and valve 7 will be stopped and fluid flow through line 3 and valve 4 will begin. The aged spheres will then fill first hopper 9. The flow of fluid and spheres into hopper 9 will be accelerated when valve 14 in line 13 is open so that line 15 containing restriction 16 will act as a bleed to remove fluid from first hopper 9.

When first hopper 9 is full, valve 4 is closed, valve 7 is open and an upward flow of fluid through the top half of line 5 results, thereby maintaining the particles in high pressure vessel 1 as a fluidized bed and preventing their descent into hopper. 9.

While the flow of particles through conduit 5 is stopped by the sealing-fluid stream through line 6, valve 14 is closed and valve 11 is open so that the particles in hopper 9 may descend thorugh line 10 into hopper 12. Hopper 12 having greater volume than hopper 9 is not completely filled by the spheres and when hopper 9 is completely empty valve 11 may close without shearing particles and without compacting the bed of particles in hopper 12. When hopper 9 is empty, valve 11 is closed and valve 7 is closed so that additional spheres may flow into hopper 9 from vessel 1. Again, valve 4 may open at this time so that a positive flow of fluid through line 5, line 15 and line 13 is maintained which flow not only facilitates the passage of spheres from vessel 1 to hopper 9 but also, when valve 14 is open, facilitates the discharge of particles from hopper 12 to the lower pressure region. Since it is desirable to have the flow through line 15 merely as a bleed or vent, line 15 will contain a restriction 16 to increase the resistance to flow. A vent 17 with valve 18 may in some cases be employed both for venting hopper 12 and for providing a bleed from hopper 9.

Valves 4, 7, 11 and 14 are preferably motor operated valves and in a preferred embodiment of this invention, they are operated from a programming means or central control point which coordinates their operation. For example, in a preferred embodiment all four valves will be operated simultaneously, however, with valves 4 and 14 in one sense and with valves 7 and 11 in the opposite sense. That is, all four valves will operate at the same time but when valves 4 and 14 are opening, valves 7 and 11 will be closing and vice versa. It may be desirable for the valves to operate at slightly spaced time intervals. For example, when the pressure difference between vessel 1 and the ultimate destination of the particles is great it may be desirable to close valve 14 a short time before valve 4 is closed and valves 7 and 11 are opened thereby building up pressure in hopper 12 so that the discharge of particles from hopper 9 will not be too violent. Any suitable timing device and arrangement may be employed within the scope of this invention and the valves may be activated electrically, pneumatically, hydraulically or by any other means responsive to the programming or timing means.

It may readily be seen that the apparatus of this invention provides a means for removing solid particles from a high pressure vessel to a lower pressure area without damaging the particles and still maintaining a seal between the high pressure area and the low pressure area. The apparatus is quite flexible and may be used to treat extremely fragile particles by selecting a suitable entraining fluid and by regulating the rate at which the particles are transferred between the various vessels and hoppers. For example, when transferring mechanically strong particles, the rate at which transfer may be made can be controlled by regulating the flow rate of fluid through line 15. When the fluid flow through line 15 is completely stopped, the particles will pass into hopper 9 by gravity and when the entraining liquid is selected to be viscous, the descent of the particles will be correspondingly slow and gentle.

I claim as my invention:

1. An apparatus for passing solid particles entrained in a fluid stream from a zone of high pressure to a zone of lower pressure comprising a pressure vessel, a first closed hopper below said vessel, an unobstructed conduit connecting the bottom of said vessel with the upper portion of said hopper, a second closed hopper of larger volume and disposed at a lower elevation than the first hopper, a valved conduit connecting the bottom of the first hopper with the upper portion of the second hopper, a valved discharge from the bottom of the second hopper, and means for alternately introducing fluid into said unobstructed conduit and into said vessel comprising a high pressure fluid inlet line, a valved conduit connecting said line with the unobstructed conduit between said vessel and first hopper and a valved conduit connecting the inlet line with the pressure vessel above the bottom thereof.

2. The apparatus of claim 1 further characterized in the provision of means for venting said second hopper and means for bleeding said first hopper.

3. The apparatus of claim 2 further characterized in that said means for venting said second hopper and means for bleeding said first hopper comprises a restricted conduit connecting the top of said first hopper with the top of said second hopper.

References Cited in the file of this patent

UNITED STATES PATENTS 2,726,137  Davis _____ Dec. 6, 1955

FOREIGN PATENTS 360,943  Great Britain _____ Nov. 9, 1931